Nov. 6, 1956  W. P. NORTON, JR  2,769,288
CUTTER RECONDITIONING APPARATUS
Filed Aug. 4, 1955  2 Sheets-Sheet 1

INVENTOR.
WENDELL P. NORTON JR.
BY John Norton
HIS ATTORNEY.

Nov. 6, 1956  W. P. NORTON, JR  2,769,288
CUTTER RECONDITIONING APPARATUS
Filed Aug. 4, 1955  2 Sheets—Sheet 2

INVENTOR.
WENDELL P. NORTON JR.
BY John Norton
HIS ATTORNEY.

United States Patent Office 2,769,288
Patented Nov. 6, 1956

2,769,288

CUTTER RECONDITIONING APPARATUS

Wendell P. Norton, Jr., Springfield, Vt., assignor to The Fellows Gear Shaper Company, Springfield, Vt., a corporation of Vermont Application August 4, 1955, Serial No. 526,361

12 Claims. (Cl. 51—241)

The present invention relates to gear cutting machines and more particularly to that type known as gear shapers in which a cutter having teeth arranged similar to those of a gear element is reciprocated with respect to a workpiece which workpiece and cutter are simultaneously rotated similar to the relative rotation between two gears. The reciprocation of the cutter with respect to the workpiece is a relative one since as is known in the art the workpiece may be reciprocated and the cutter held against reciprocation. The machine involved in the present invention is one of those of the well known Fellows type such as is shown in the patent of E. W. Miller No. 2,034,765 which issued March 24, 1936.

The invention herein concerned deals particularly with an attachment for gear shapers of the type described which attachment serves to recondition the cutting tool employed so as to prolong its life and to reduce the number of sharpenings necessary when in use.

The main object of the present invention is to provide a device which reconditions the cutting tool on the gear shaper while the cutting tool is in the process of cutting gears and thereby reduces the number of times that the cutter must be removed from the cutter spindle to be resharpened. Another object is to prolong the active life of the cutting tool by reducing the amount of material that must be removed from the cutter when it is resharpened. Still another object is to maintain the cutting tool in its most effective sharpened condition whereby uniform cutting conditions will be maintained and thereby better and more accurate gears will be obtained from the gear cutting operation.

The drawings illustrate one of the possible embodiments of the invention. Like reference characters designate the same parts wherever they occur in the accompanying drawings.

In the drawings furnished herewith;

Figure 1:
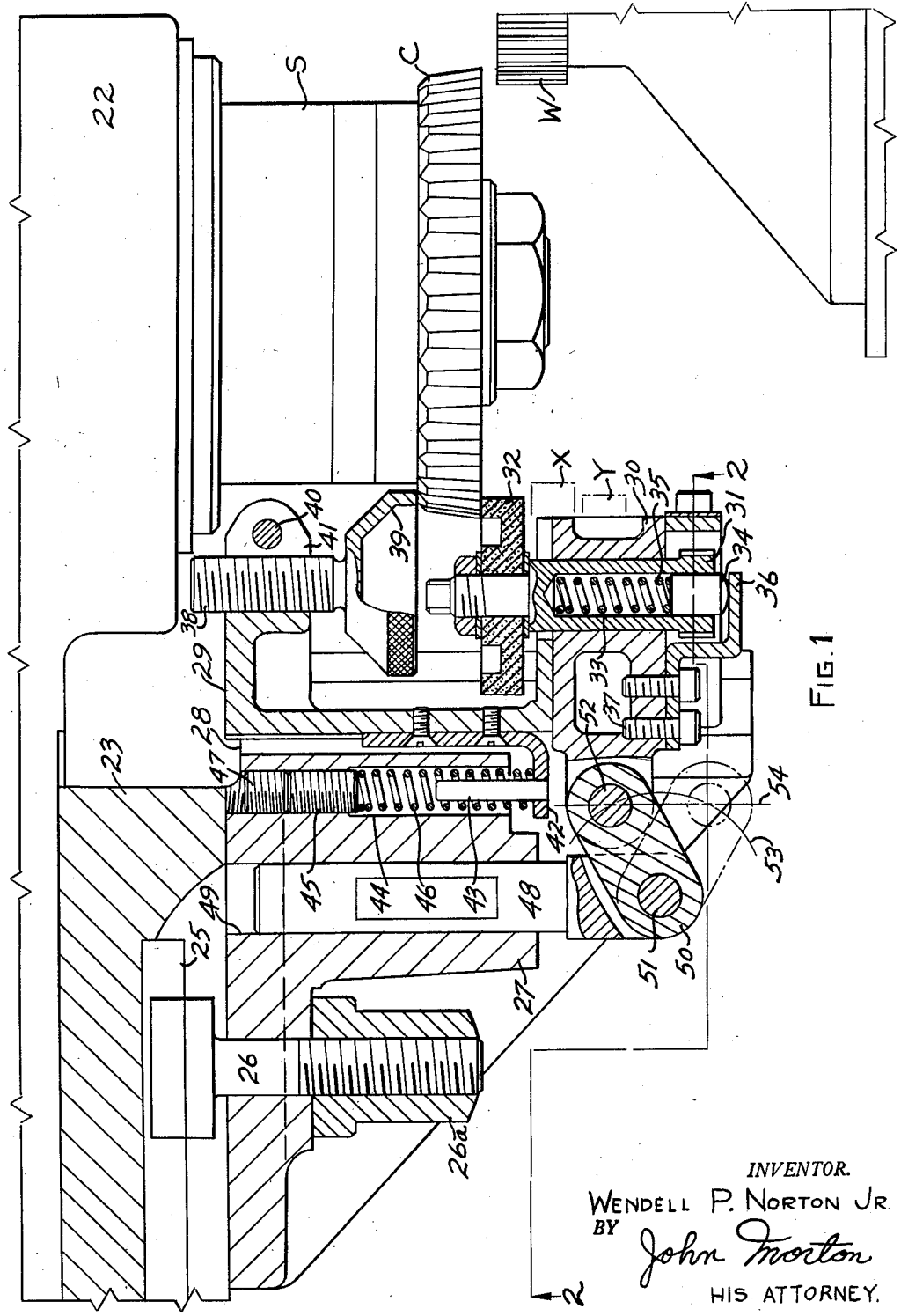
Figure 1 is a view partially in section showing the attachment of the present invention placed on a gear shaper in operative relation to the cutter and workpiece.

As shown in Figure 1 the cutter saddle 22 which corresponds with the cutter saddle 22 of the above mentioned patent has mounted therein a cutter spindle S on which a cutter C is mounted. This cutter C is reciprocated and simutaneously rotated in the manner well known in the art. During its reciprocation and rotation it forms teeth on the workpiece W which is mounted on a work spindle and which work spindle is rotated and due to the relative rotation and relative reciprocation between cutter and work teeth are generated on the workpiece W which teeth are conjugate to the teeth formed on the cutter C.

Figure 3:
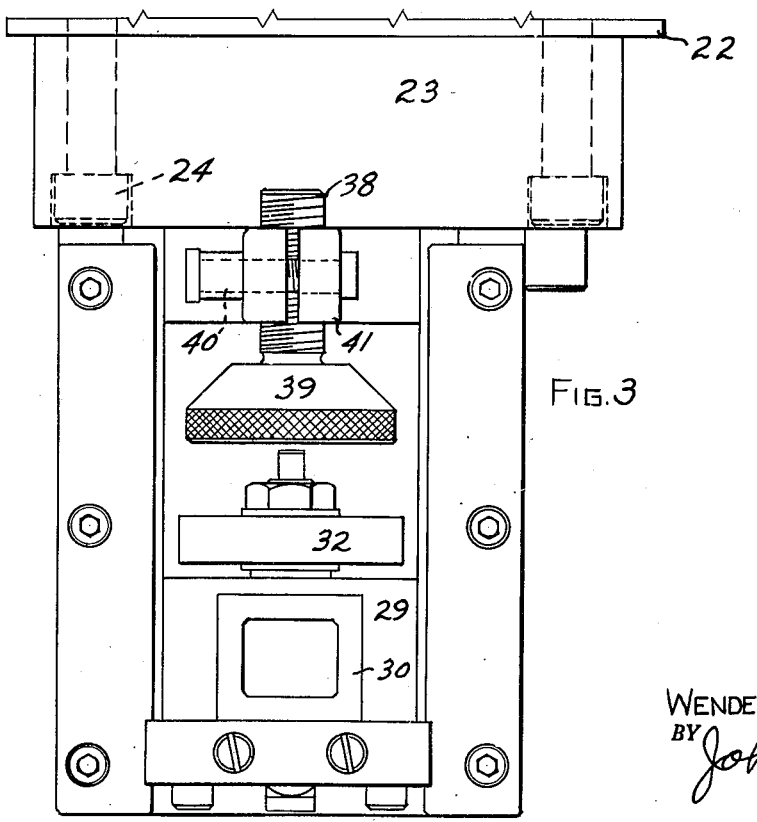
Figure 3 is an end elevation of the attachment of the present invention.

Fixed to the cutter saddle 22 is a mounting block 23. As shown in Figure 3 this mounting block 23 is held on the cutter saddle 22 by bolts 24. Referring to Figure 1 it will be seen that the mounting block 23 has formed therein a groove 25 which groove 25 is shaped to receive the head of a T-bolt 26. T-bolt 26 secures a base member 27 to the mounting block 23. Formed on the base member 27 is a vertical guideway 28. This guideway 28 has ways formed therein which ways may be of any desired configuration but are adapted to receive complemental ways formed on a slide 29.

On its lower end the slide 29 has an opening formed therein which opening receives an arbor support member 30. This arbor support member is slideable in the slide 29 transverse to the slide movement and transverse also to the direction of reciprocation of the cutter spindle mounted in the cutter saddle 22. The arbor support member 30 has mounted therein an arbor 31. This arbor 31 is capable of limited vertical movement in the arbor support member 30 for the purpose later to be described. On the arbor 31 is mounted a reconditioning tool 32. The tool 32 may be a tool of the type generally known as a hone or an abrasive tool or may be a metallic tool similar to a file and of course may be of any suitable material which is capable of acting on the cutter in order to recondition the cutting edges of the cutter so as to maintain them in the desired sharpened and properly conditioned condition.

The arbor 31 has formed therein an opening 33 which opening is adapted to receive a plug member 34. Also in the opening 33 is a spring member 35 which spring member acts against the plug member 34 to urge it downwardly as viewed in Figure 1. Otuward and downward movement of the plug member 34 is limited by a bracket member 36 which bracket member 36 is held on the arbor support member 30 by means of cap screws designated 37.

Threaded into the slide member 39 is an abutment screw 38. This abutment screw 38 has an enlarged head 39 formed thereon as shown in Figure 1 and this enlarged head is adapted to engage the upper face of the cutter C. As will be obvious the abutment screw 38 may be adjusted by reason of its threaded engagement with the slide 29 and upon adjustment is locked in position by a set screw 40 threaded into the split portion 41 of the slide 29.

Fixed to the slide member 39 by means of cap screws or the like is a supporting bracket 42. Fixed in the supporting bracket 42 is a pin member 43 which pin member 43 extends upwardly into an opening 44 formed in the base member 27. This opening 44 has a threaded upper end. Threaded in said upper end is a set screw 45. The set screw 45 abuts a spring 46 which is fitted into the lower end of the opening 44. The spring 46 encircles the pin member 43 which is mounted in the supporting bracket 42.

The set screw 45 is rotated to adjust the tension on the spring 46 so as to adjust the urging tendency which the spring member 46 will exert on the bracket 42 and in turn on the slide 29. After the set screw 45 is adjusted to obtain the desired amount of tension the set screw 45 is locked in position by a second set screw 47 which is likewise threaded into the upper portion of the opening 44.

Mechanism is provided to impart the transverse movement to the arbor support member 30. This mechanism as shown in Figure 1 includes a pin member 48 which pin member is held by any desired means in an opening 49 formed in the base member 27. This pin member is vertically adjustable to a certain extent. After being adjusted it is held in position by a set screw or other suitable means. The pin member 49 has pivotally mounted to it at its lower end a link 50. This link 50 is journalled at 51 to the pin member 49 and is also journalled as shown at 52 to the arbor support member 30. The link member 50 is capable of swinging movement through the arc 53 as shown in Figure 1. It will be obvious that as the link member 50 swings through its arc 53 that the arbor support member 30 will be given an amount of reciprocating movement equivalent to the distance between the arc 53 and the chord 54.

Figure 2:
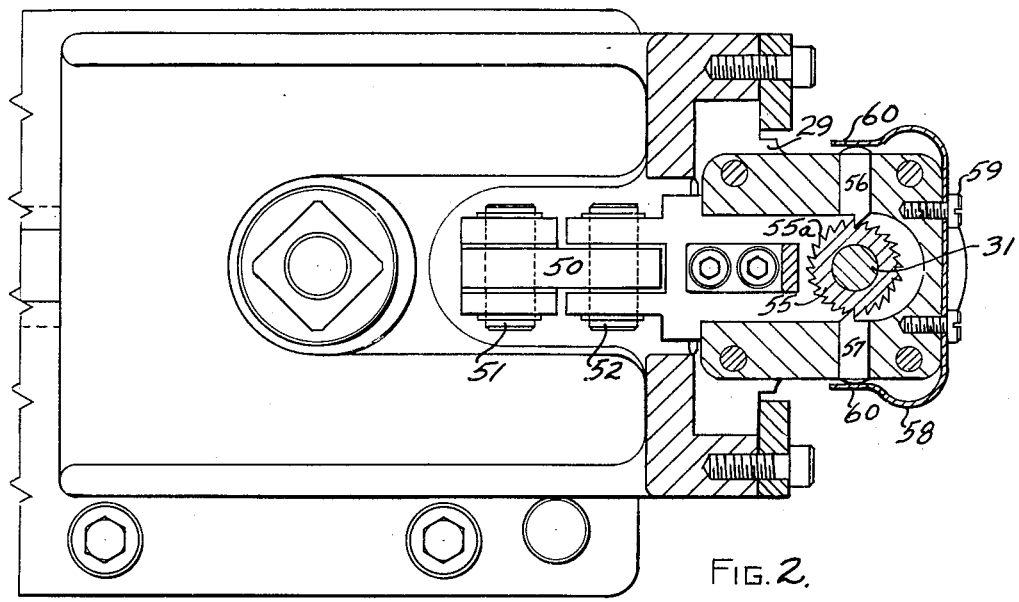
Figure 2 is a partial section looking in the direction taken on the line 2—2 of Figure 1.

A means is provided to rotate the arbor 31 during the transverse reciprocation of the arbor support 30. As shown in Figure 2 this means includes a ratchet member 55 which is fixed to the arbor 31. This ratchet member 55 has two pawls 56 and 57 engaging the teeth 55a formed on the ratchet 55. These pawls 56 and 57 are slidably mounted in the slide member 39. The pawls 56 and 57 are held against rotation by suitable keys (not shown).

Fixed to the slide 29 is a spring clip 58. The spring clip 58 is fixed to the slide 29 by means of cap screws generally designated 59 in Figure 2. The spring clip 58 has rearwardly extending fingers 60 and 61 which as shown in Figure 2 engage the outwardly extending portions of the pawl members 56 and 57. The spring fingers 60 and 61 act to urge the pawl members 56 and 57 into engagement with the teeth 55a formed on the ratchet member 55.

As will be seen in Figure 2 as the arbor support member 30 moves to the right carrying with it the arbor 31 and the ratchet member 55 due to the configuration of the teeth 55a formed on the ratchet 55 and their engagement with the pawl member 56 the arbor member 31 will be rotated in a counterclockwise direction on the rightward or advancing movement of the arbor support member 30. During this movement the reconditioning tool 32 will be passing from the outside diameter of the cutter C toward the root of the teeth formed on the cutter.

Similarly when the arbor support member 30 moves to the left as viewed in Figure 2 the arbor 31 will be given an added counterclockwise movement due to the engagement of the pawl member 57 with the teeth formed on the ratchet member 55. During this leftward movement of the arbor support the reconditioning tool 32 will be passing from the roots of the teeth formed on cutter C toward the outside diameter thereof.

Due to the action of both pawl members 56 and 57 and their cooperation with the teeth 55a formed on the ratchet member 55 therefore the arbor member 31 will be given increments of counterclockwise movement in both directions of movement of the arbor support member 30.

When in use the attachment of the present invention operates in the manner set forth below. When the cutter C has been placed on its cutter spindle on the gear shaper the attachment of the present invention is placed in position by placing the base member 27 in position and securing it to the mounting block 23 securely by means of the T-bolt 26 and its cooperating nut member 26a. Groove 25 and T-bolt 26 provide a means to adjust the base member 27 laterally so as to locate the tool 32 in the proper transverse position with respect to the teeth on cutter C which are to be reconditioned.

When so placed in position the reconditioning or sharpening tool 32 abuts the lower face of the cutter C as shown in Figure 1. When the sharpening tool 32 is in position against the cutter C the abutment screw 38 is adjusted until it abuts the upper face of the cutter C. When these adjustments are made the device is ready to begin its operation.

As the cutter C reciprocates it acts against the sharpening tool 32 and forces the sharpening tool 32 and the slide member 29 downwardly along with itself. In order to eliminate any unnecessary force acting on the sharpening tool 32 and so cause damage to the tool 32 the spring member 46 is employed to act also on the slide member 29 and aid the action of the cutter C in forcing the slide member 29 downwardly.

As the cutter C reciprocates upwardly on its return movement it acts against the head 39 of the abutment screw 38 to lift the slide member 29 and with it the sharpening tool 32. At this time the spring member 35 acts to hold the sharpening tool against the cutter C and to insure its bearing against the teeth of the cutter.

During the vertical reciprocation of the slide 29 the arbor support member 30 is being given a transverse reciprocation to the movement of the slide by means of the link member 50. As the link member 50 is pivoted about its journal member 51 it is given the movement through the arc 53 previously referred to and as will be obvious a small amount of reciprocation is imparted to the arbor support member 30 and therefore to the sharpening tool 32.

The broken lines X and Y in Figure 1 show two positions taken by tool 32 during its combined movements of vertical and transverse reciprocation as it moves with the reciprocation of cutter C.

As set forth above during the vertical and transverse movements referred to the sharpening tool is also given a rotatable movement through the action of the ratchet member 55 and the pawl members 56 and 57 and their co-action as described above. It will be obvious that in some cases the rotative movement of the sharpening tool need not be employed but in many cases it is highly desirable.

It will be understood that the use of such terms as vertical, upward, and downward are employed in a relative sense and are not to be construed as limitations except as may be set forth in the appended claims.

What I claim and desire to secure by Letters Patent is:

1. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said machine, an arbor support member mounted on said base member, said arbor support being mounted for vertical movement with said cutter spindle, a sharpening tool mounted on said arbor support and adapted to engage said cutter and means to impart vertical reciprocation to said arbor support in accordance with the reciprocation of said cutter spindle.

2. In a gear shaper of the character described having a cutter saddle, a cutter spindle mounted for rotation and reciprocation in said cutter saddle, a rotatable work spindle mounted adjacent to said cutter spindle, and means to rotate said cutter and work spindles in timed relation, a means for sharpening a disc-like cutter mounted on said cutter spindle comprising a base member fixed to said machine, an arbor mounted on said base for vertical movement in the direction of the reciprocation of said cutter spindle, a sharpening tool fixed to said arbor adapted to contact one face of said disc-like cutter and means to vertically reciprocate said arbor responsive to reciprocation of said cutter spindle.

3. In a gear shaper of the character described having a cutter saddle, a cutter spindle mounted for rotation and reciprocation in said cutter saddle, a rotatable work spindle mounted adjacent to said cutter spindle, and means to rotate said cutter and work spindles in timed relation, a means for sharpening a disc-like cutter mounted on said cutter spindle comprising a base member fixed to said gear shaper, a rotatable arbor mounted on said base member for vertical movement in accordance with the reciprocation of said cutter spindle, a sharpening tool fixed to said arbor adapted to contact a face of said disc-like cutter, means to vertically reciprocate said arbor responsive to reciprocation of said cutter spindle and means to rotate said arbor during its reciprocation.

4. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said saddle, an arbor support member mounted on said base member and arranged for vertical movement with said cutter spindle and for movement transverse to said cutter spindle, an arbor rotatably mounted in said arbor support, a sharpening tool fixed to said arbor and adapted to contact said cutter, and means to impart vertical movement to said arbor support in accordance with the reciprocation of said cutter spindle.

5. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said saddle, an arbor support member mounted on said base member and arranged for vertical movement with said cutter spindle and for movement transverse to said cutter spindle, an arbor mounted in said arbor support, a sharpening tool fixed to said arbor and adapted to contact said cutter, means to impart vertical movement to said arbor support in accordance with the reciprocation of said cutter spindle and means to impart said transverse movement to said arbor support during said vertical movement.

6. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said saddle, an arbor support member mounted on said base member and arranged for vertical movement with said cutter spindle and for movement transverse to said cutter spindle, an arbor rotatably mounted in said arbor support, a sharpening tool fixed to said arbor and adapted to contact said cutter, means to impart vertical movement to said arbor support in accordance with the reciprocation of said cutter spindle, means to impart said transverse movement to said arbor support during said vertical movement and means to rotate said arbor in time with the movements of said arbor support.

7. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a slide member mounted for vertical movement with said cutter spindle, an arbor support member mounted on said slide member for movement transverse with respect to the movement of said slide, a sharpening tool mounted on said arbor support for movement therewith, said sharpening tool being arranged to contact said cutter during its reciprocation, and means responsive to the reciprocation of said cutter to impart said transverse movement to said arbor support.

8. In a machine of the characater described having a cutter saddle, a cutter spindle mounted for rotation and reciprocation in said cutter saddle, and a rotatable work spindle adjacent to said cutter spindle, a means for sharpening a cutter mounted on said cutter spindle comprising a slide member mounted for vertical movement with said cutter spindle, an arbor support member mounted on said slide member for movement transverse with respect to the movement of said slide, a sharpening tool mounted on said arbor support for movement therewith, said sharpening tool being arranged to contact said cutter during its reciprocation, means resiliently urging said sharpening tool into contact with said cutter, and means responsive to the reciprocation of said cutter to impart said transverse movement to said arbor support.

9. In a machine of the character described in claim 8 wherein means is provided to reciprocate said slide vertically which means includes an abutment screw threaded in said slide to abut one face of said cutter to urge said slide in one direction and wherein said slide is urged in the opposed direction by the contact between the sharpening tool and said cutter.

10. In a machine of the character described in claim 8 wherein the means to impart transverse movement to the arbor support includes a link member pivoted at one end thereof to said cutter saddle and at the other end thereof being pivoted to said arbor support.

11. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said saddle, a vertical guideway on said base, a slide mounted on said guideway, a second guideway on said slide, an arbor support member slideably mounted on said second guideway, a rotatable arbor mounted in said arbor support, a sharpening tool mounted on said arbor adapted to engage said cutter, and means to impart movement to said sharpening tool in accordance with the reciprocation of said cutter spindle.

12. In a machine of the character described having a cutter saddle, a cutter spindle mounted for rotation and reciprocation in said cutter saddle, and a rotatable work spindle adjacent to said cutter spindle, a means for sharpening a cutter mounted on said cutter spindle comprising a base member fixed to said saddle, an arbor support member fixed to said base member and arranged for vertical movement with said cutter spindle and for movement at an angle to said cutter spindle, an arbor rotatably mounted in said arbor support, a sharpening tool fixed to said arbor and positioned to contact said cutter, and means to reciprocate said arbor support in accordance with the reciprocate of said cutter spindle, said reciprocating means including a link member journalled at one end thereof to said base member and at the other end thereof being journalled on said support member whereby the vertical movement of said arbor support imparts a reciprocating motion thereto.

No references cited.